(12) United States Patent
Suzuki et al.

(10) Patent No.: US 11,804,749 B2
(45) Date of Patent: Oct. 31, 2023

(54) STATOR AND BUSBAR MODULE

(71) Applicants: TOYOTA JIDOSHA KABUSHIKI KAISHA, Toyota (JP); AISIN CORPORATION, Kariya (JP)

(72) Inventors: Yasunori Suzuki, Toyota (JP); Akihide Takehara, Toyota (JP); Takuya Kitao, Kariya (JP); Ryoji Nakajima, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 113 days.

(21) Appl. No.: 17/591,344

(22) Filed: Feb. 2, 2022

(65) Prior Publication Data

US 2022/0255389 A1 Aug. 11, 2022

(30) Foreign Application Priority Data

Feb. 9, 2021 (JP) ................................. 2021-019128

(51) Int. Cl.
*H02K 3/50* (2006.01)
*H02K 3/52* (2006.01)
*H02K 5/22* (2006.01)

(52) U.S. Cl.
CPC ................. *H02K 3/50* (2013.01); *H02K 3/52* (2013.01); *H02K 5/225* (2013.01); *H02K 2203/09* (2013.01)

(58) Field of Classification Search
CPC ............ H02K 3/50; H02K 3/28; H02K 3/522; H02K 2203/09; H02K 5/225; H02K 3/52; H02K 3/38; H02K 1/16

USPC .......................................................... 310/71
See application file for complete search history.

(56) References Cited

U.S. PATENT DOCUMENTS

| | | | |
|---|---|---|---|
| 2012/0319512 A1* | 12/2012 | Nakagawa | H02K 1/278 310/71 |
| 2014/0232223 A1* | 8/2014 | Takasaki | H02K 3/28 310/71 |
| 2020/0052540 A1* | 2/2020 | Mashiko | H01B 7/40 |
| 2021/0013761 A1 | 1/2021 | Mashiko et al. | |

FOREIGN PATENT DOCUMENTS

| | | |
|---|---|---|
| JP | 2019115178 A | 7/2019 |
| JP | 6673518 B1 | 3/2020 |
| JP | 2020114116 A | 7/2020 |

* cited by examiner

*Primary Examiner* — Alexander A Singh
(74) *Attorney, Agent, or Firm* — HUNTON ANDREWS KURTH LLP

(57) ABSTRACT

A stator of the present disclosure includes a stator core, a stator coil wound around the stator core, and a busbar module electrically connected to the stator coil and fixed to a coil end portion formed on one end side of the stator core. The busbar module includes a module body that holds a conductive member, a hole that penetrates the module body, and a bridge portion that extends from a part of the inner peripheral surface of the hole to another part of the inner peripheral surface so as to divide an inside of the hole into a plurality of opening regions and is fixed to the coil end portion with an adhesive introduced into the hole and cured therein. In the stator, the busbar module is fixed more firmly to the coil end formed on one end side of the stator core with the adhesive.

7 Claims, 7 Drawing Sheets

STATOR AND BUSBAR MODULE

CROSS-REFERENCE TO RELATED APPLICATION

The present disclosure claims priority to Japanese Patent Application No. 2021-019128 filed on Feb. 9, 2021, which is incorporated herein by reference in its entirety including specification, drawings and claims.

TECHNICAL FIELD

The present disclosure relates to a stator including a stator core and a stator coil wound around the stator core, and a busbar module electrically connected to the stator coil.

BACKGROUND

A conventionally known stator includes a power distribution member that includes a plurality of conductive wires and electrically connects a plurality of coil ends (leading wires) protruding from the stator core in the axial direction and electrodes of a terminal block (as described in, for example, Patent Literature 1). The Patent Document 1 discloses a fixing portion that is disposed in a holding portion of a power distribution member that holds the conductive wires so as to fix the power distribution member to another component such as a flange portion with a bolt insertion hole. Such a structure between the power distribution member and another component suppresses vibration at the power distribution member, welded portions between the power distribution member and the coil ends, and a connection portion between the power distribution member and the terminal block.

Further, a conventionally known stator includes a busbar module that faces an outer end surface in an axial direction of a coil end portion formed on one end side of a stator core (as described in, for example, Patent Literature 1). The busbar module of the stator includes a plurality of conductor plates (busbars) for applying an electric current to the stator coils, and a resin-made module body including the conductor plates. Further, a plurality of through grooves are formed at an end portion (peripheral portion) of the module body in a radial direction of the stator so as to penetrate the module body in an axial direction of the stator. An opening of each through groove on an end side in the radial direction is closed by a bridge integrally formed with the module body. The busbar module and the coil end portion are fixed to each other by an adhesive applied so as to surround the bridge and adhere to the coil end portion.

CITATION LIST

Patent Literature

PTL1: Japanese Patent Publication No. 6673518
PTL2: Japanese Patent Application Laid Open No. 2020-114116

SUMMARY

When the power distribution member is fixed to another component with bolts as in the stator described in Patent Document 1, a space for arranging the bolts and the fixing portion is required around the power distribution member, and the stator may become large. Thus, as described in Patent Document 2, it is preferable to fix the busbar module to the coil end portion with the adhesive. However, in the stator described in Patent Document 2, it is not easy to apply an adhesive so as to completely surround the bridges since through grooves and bridges are formed on the peripheral edge of the module body. Further, sufficient adhesive strength between each of the bridges and the coil end portion may not be secured due to a lack of a contact area between the module body and the adhesive. Hence, it is required to increase the contact area between the module body and the adhesive to improve the adhesive strength between each of the bridges and the coil end portion.

A main object of the present disclosure is to fix the busbar module more firmly to the coil end formed on one end side of the stator core with the adhesive.

A stator of the present disclosure includes a stator core, a stator coil wound around the stator core, and a busbar module electrically connected to the stator coil and fixed to a coil end portion formed on one end side of the stator core. The busbar module includes a module body that holds a conductive member, a hole that penetrates the module body, and a bridge portion that extends from a part of the inner peripheral surface of the hole to another part of the inner peripheral surface so as to divide an inside of the hole into a plurality of opening regions and is fixed to the coil end portion with an adhesive introduced into the hole and cured therein.

The stator of the present disclosure includes the busbar module electrically connected to the stator coil and fixed to the coil end portion formed on one end side of the stator core. The module body of the busbar module includes the hole that penetrates the module body, and a bridge portion that is fixed to the coil end portion with the adhesive introduced into the hole and cured therein. The bridge portion extends from the part of the inner peripheral surface of the hole to another part of the inner peripheral surface so as to divide the inside of the hole into the opening regions. Thus, opening regions are formed on both sides of the bridge portion, and the adhesive introduced into the hole reaches the coil end portion through the opening regions on both sides of the bridge portion after hitting against the bridge portion. As a result, the adhesive adheres to the bridge portion so as to surround the bridge portion and adheres to the inner peripheral surface of the hole, such that a contact area between the adhesive and the module body is sufficiently increased. Further, since the opening regions are formed on both sides of the bridge portion, the adhesive adheres to the inner peripheral surfaces of the bridge portion and the hole sufficiently inside a peripheral edge portion of the module body and is cured therein. As a result, a fixing strength of the module body to the coil end portion is improved as compared with the case where the adhesive is introduced into the through groove of the peripheral edge portion of the module body. Accordingly, in the stator of the present disclosure, the busbar module is more firmly fixed to the coil end portion formed on one end side of the stator core with the adhesive, such that electrical connections between the stator coils and the busbar module are favorably maintained.

DESCRIPTION OF EMBODIMENTS

The following describes some embodiments of the disclosure with reference to drawings.

Figure 1:
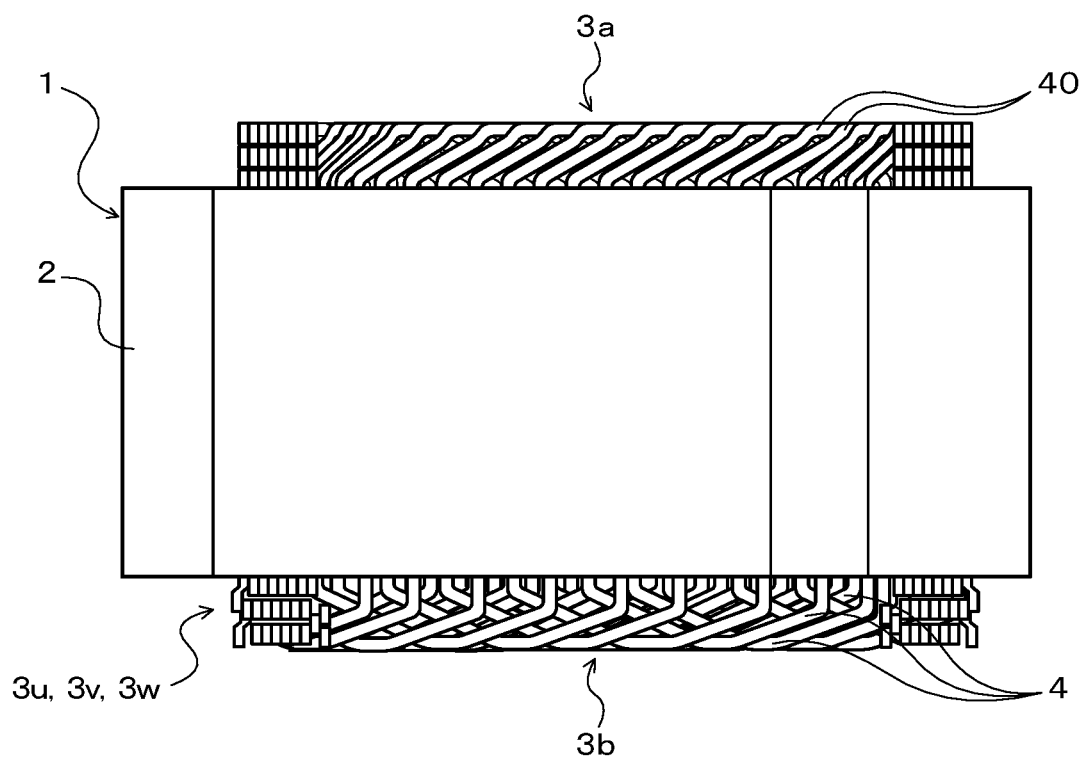
FIG. 1 is a schematic configuration diagram illustrating the stator according to the present disclosure.
Figure 2:
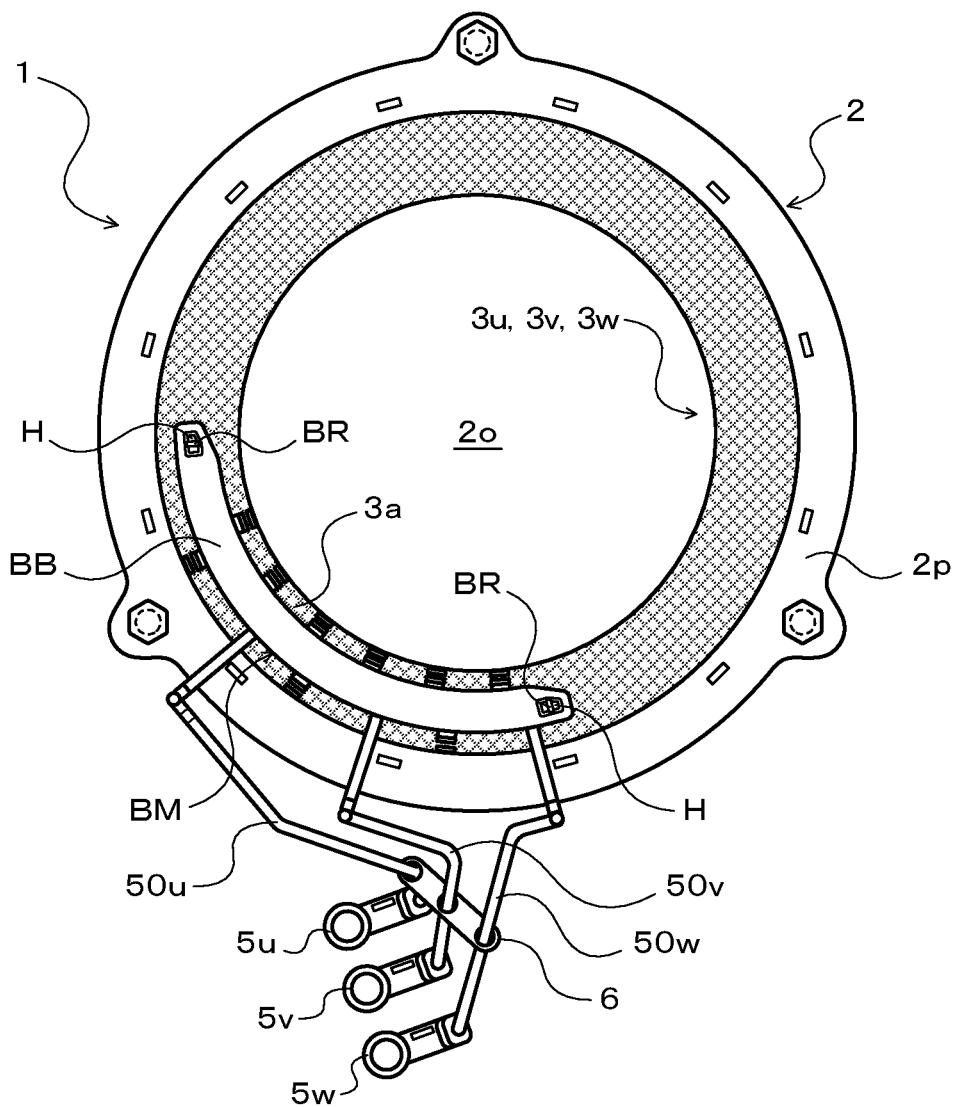
FIG. 2 is a plan view illustrating the stator according to the present disclosure.

FIG. 1 is a schematic configuration diagram illustrating a stator 1 according to the present disclosure. FIG. 2 is a plan view illustrating the stator 1. The stator 1 illustrated in these drawings constitutes, for example, a three-phase AC motor (rotating electrical machine) used as a driving power source or a generator of a battery electric vehicle, a hybrid electric vehicle or the like together with a rotor (not shown). The stator 1 of the present disclosure includes an annular stator core 2, a stator coil 3u (U phase coil), a stator coil 3v (V phase coil), and a stator coil 3w (W phase coil).

The stator core 2 of the stator 1 is formed by layering a plurality of electromagnetic steel plates 2p (shown in FIG. 2) formed in an annular, for example, by pressing. The stator core 2 may be integrally formed by, for example, press molding and sintering ferromagnetic fine particles. The stator core 2 includes a center hole 2o in which the rotor is disposed, a plurality of teeth (not shown) radially extending from an annular outer circumferential portion (yoke) toward an axis (a center of the stator core 2) and arranged adjacent to each other at constant intervals in a circumferential direction, and a plurality of slots formed between respective adjacent teeth (not shown). The plurality of slots are respectively extended in a radial direction of the stator core 2 and are arranged at constant intervals along the circumferential direction. Each of the slots of the stator core 2 is opened at the center hole 20 and an insulator (insulating paper, not shown) is disposed in each slot.

Each of the stator coils 3u, 3v and 3w of the stator 1 is formed by electrically connecting a plurality of segment coils 4 that are inserted in the plurality of slots 2s of the stator core 2. The segment coil 4 is formed by bending a rectangular wire (conductor) with an insulating film such as an enamel coat formed on a surface thereof in substantially U-shape. Further, each of the segment coils 4 includes a pair of (two) legs 40. At a tip of the leg 40, the insulating film is removed to expose the conductor.

The pair of (two) legs 40 of each segment coil 4 are respectively inserted in different slots 2s of the stator core 2 and each of the legs 40 protruding from one end face (upper end face in FIG. 1) of the stator core 2 are bent (twisted) by a bending machine (not shown). The tip of each leg 40 is electrically connected to the tip of the corresponding another segment coil 4 (leg 40) by welding (for example, TIG welding in this embodiment). Thus, the stator coils 3u, 3v and 3w are wound around the stator core 2. Further, an annular coil end portion 3a is formed on one end side (upper end in FIG. 1) of the stator core 2 in an axial direction, and an annular coil end portion 3b is formed on the other end side (lower end in FIG. 1). The coil end portions 3a and 3b are respectively formed of the stator coils 3u, 3v and 3w, that is, segment coils 4, and project outward from the corresponding end faces of the stator core 2 in the axial direction.

Figure 3:
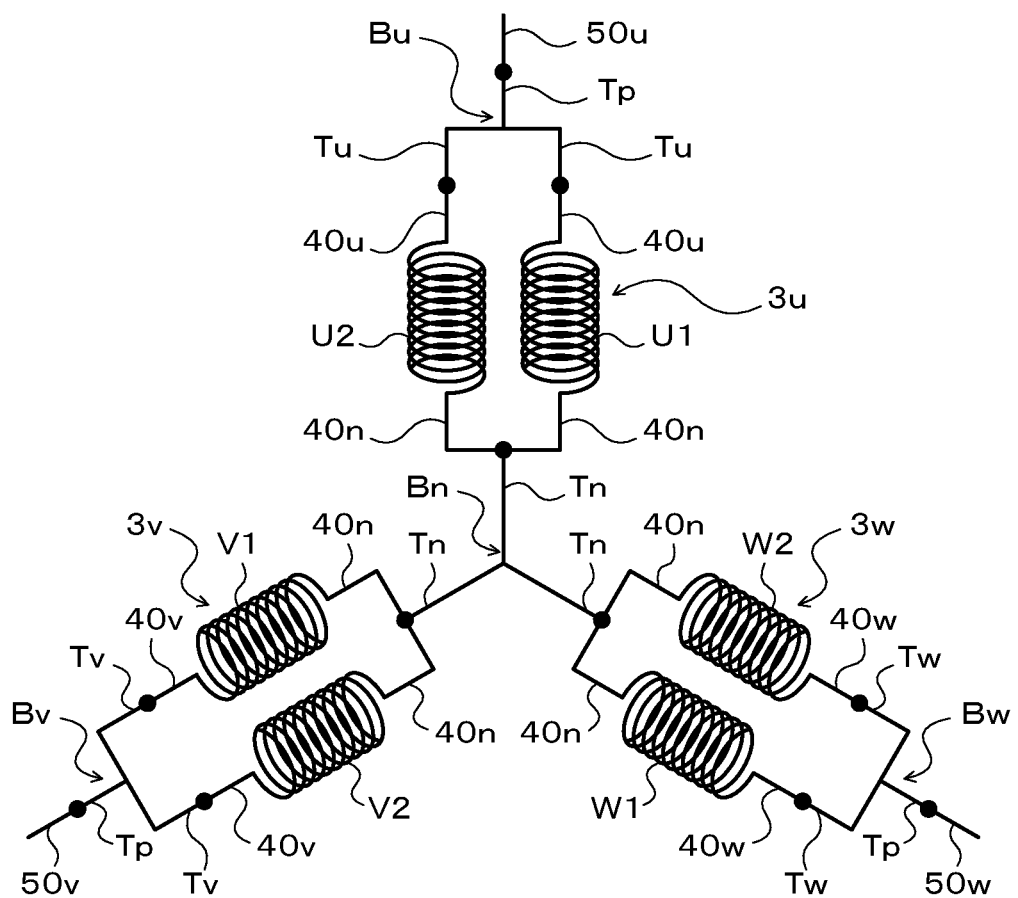
FIG. 3 is a schematic view exemplifying the stator coil of the stator according to the present disclosure.

In this embodiment, as shown in FIG. 3, the stator coils 3u, 3v and 3w are connected by double star connection (2Y connection). That is, the stator coil 3u includes a first coil U1 and a second coil U2 that are connected in parallel with each other. The first and second coils U1 and U2 include a leader line 40u and a neutral line 40n respectively formed by one leg 40 of the predetermined segment coil 4. The stator coil 3v includes a first coil V1 and a second coil V2 that are connected in parallel with each other. The first and second coils V1 and V2 include a leader line 40v and a neutral line 40n respectively formed by one leg 40 of the predetermined segment coil 4. The stator coil 3w includes a first coil W1 and a second coil W2 that are connected in parallel with each other. The first and second coils W1 and W2 include a leader line 40w and a neutral line 40n respectively formed by one leg 40 of a predetermined segment coil 4.

Figure 4:
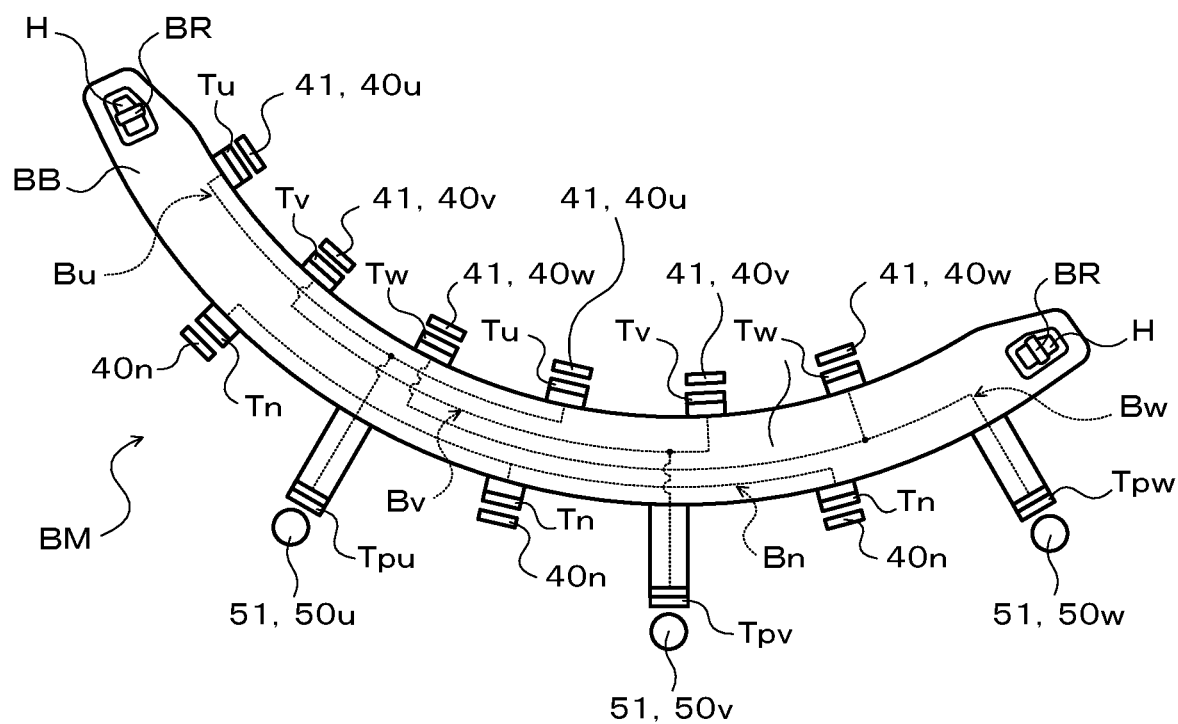
FIG. 4 is a schematic configuration diagram illustrating the busbar module according to the present disclosure.

Further, in this embodiment, two leader lines 40u of the stator coil 3u (the first and second coils U1 and U2), two leader lines 40v of the stator coil 3v (the first and second coils V1 and V2), and two leader lines 40w of the stator coil 3w (the first and second coil W1 and W2) are electrically connected to corresponding terminals Tu, Tv or Tw of a busbar module BM shown in FIG. 4 by welding (for example, TIG welding in this embodiment). Further, two neutral lines 40n of the stator coil 3u (the first and second coils U1 and U2), two neutral lines 40n of the stator coil 3v (the first and second coils V1 and V2), and two neutral lines 40n of the stator coil 3w (the first and second coils W1 and W2) are electrically connected to a corresponding terminal Tn of the busbar module BM by welding (for example, TIG welding in this embodiment).

The busbar module BM forms a neutral point of the stator coils 3u, 3v, 3w and electrically connects the stator coils 3u, 3v, 3w and power lines 50u, 50v, 50w. As shown in FIG. 4, the busbar module BM includes a busbar Bu corresponding to the stator coil 3u of a U-phase, a busbar Bv corresponding to the stator coil 3v of a V-phase, a busbar Bw corresponding to the stator coil 3w of a W-phase, the busbar Bn forming the neutral point, and a module body BB formed of an insulator such as resin. The module body BB holds (includes) the busbars Bu, Bv, Bw and Bn, which are conductive members, so as not to contact each other. Further, in this embodiment, the module body BB of the busbar module BM is formed so as to extend in a substantially arc by an insert molding or the like.

The busbar Bu includes two end portions (terminals) Tu that are electrically connected to the leader lines 40u of the first or second coils U1, U2 of the stator coil 3u respectively, and single end portion (terminal) Tpu. The busbar Bv includes two end portions (terminals) Tv that are electrically connected to the leader lines 40v of the first or second coils V1, V2 of the stator coil 3v respectively, and single end portion (terminal) Tpv. The busbar Bw includes two end portions (terminals) Tw that are electrically connected to the leader lines 40w of the first or second coils W1, W2 of the stator coil 3w respectively, and single end portion (terminal) Tp. Further, the busbar Bn includes three end portions (terminals) Tn. The end portions Tu, Tv, Tw, Tn, Tpu, Tpv, and Tpw of the busbar Bu-Bn are respectively exposed to an outside from the module body BB.

The end portion Tpu of the busbar Bu is electrically connected to a tip portion (conductor exposed portion from which the insulating firm has been removed) 51 of the power line 50u by welding (for example, TIG welding in this embodiment). Further, the end portion Tpv of the busbar By is electrically connected to a tip portion 51 of the power line 50v by welding, and the end portion Tpw of the busbar By is electrically connected to a tip portion 51 of the power line 50w by welding. The power lines 50u, 50v, and 50w are formed of, for example, a conductor with an insulating film formed on a surface thereof, and are respectively held by a resin-made holding member 6.

The terminals 5u, 5v, 5w (see FIG. 2) of each of the power lines 50u, 50v, 50w are fixed to a terminal block (not shown) mounted (fixed) in a housing of the three-phase AC motor when the stator 1 is assembled to the housing, and are respectively connected to an inverter (not shown) via an electric power line. Further, each of the end portions Tn of the busbar Bn is electrically connected to corresponding one of the neutral lines 40n of the first and second coils U1 and U2 of the stator coil 3u, the neutral lines 40n of the first and second coils V1 and V2 of the stator coil 3v, and the neutral lines 40n of the first and second coils W1 and W2 of the stator coil 3w by welding (for example, TIG welding in this embodiment). As a result, the busbar Bn forms the neutral point of the stator coils 3u, 3v, 3w.

Further, a resin (thermosetting resin) such as varnish is applied to the stator core 2 from a side of the coil end portion 3a (an upper side in FIG. 1) toward a side of the coil end portion 3b (a lower side in FIG. 1). When the resin is cured, each of the segment coils 4 and the insulators (not shown) are fixed to the stator core 2. Further, insulating powder is applied to exposed portions of the conductors such as joint portions between the tip portions of the segment coil 4. Instead of applying the insulating powder to the exposed portions of the conductors, an annular resin mold portion may be formed on the stator 1 so as to cover the coil end portion 3a.

In the stator 1 configured as described above, the stator coils 3u, 3v, 3w are electrically connected to the power lines 50u, 50v, 50w via the bus bar module BM. When the busbar module BM is not fixed to another member in the stator 1, due to a movement (vibration) of the bus bar module BM with respect to the stator core 2, forces are applied to welded portions (electrical connection portions) between the stator coils 3u, 3v, 3w and the bus bar module BM (terminals Tu, Tv, Tw, Tn) and a plurality of welded portions (electrical connection portions) between the busbar module BM (terminals Tpu, Tpv, Tpw) and the power lines 50u, 50v, 50w. As a result, durability of the welded portions may decrease.

Figure 5:
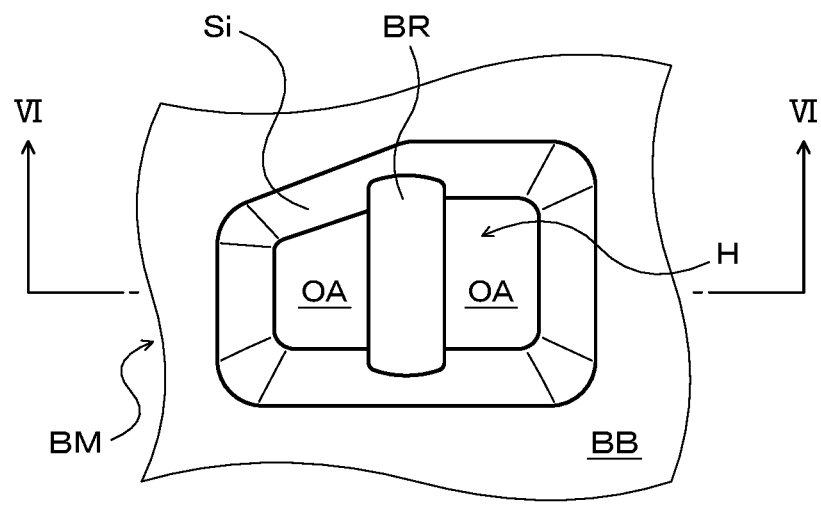
FIG. 5 is an enlarged view illustrating the busbar module according to the present disclosure.
Figure 6:
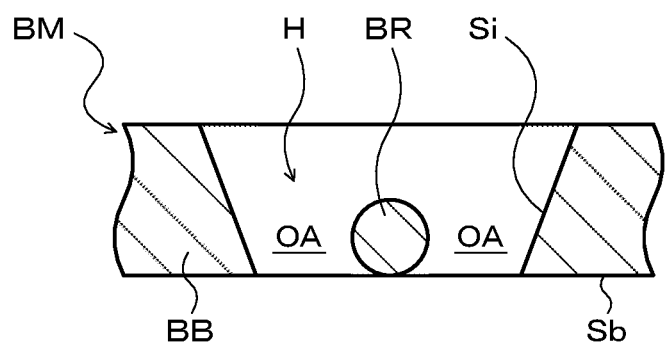
FIG. 6 is a sectional view along VI-VI line of FIG. 5.

In this embodiment, as shown in FIG. 2, the bus bar module BM is adhered with an adhesive to an outer surface (upper surface) in the axial direction of the upper coil end portion 3a (segment coils 4 forming the coil end portion 3a) in FIG. 1. That is, as shown in FIGS. 4 and 5, in order to fix the bus bar module BM to the outer surface of the coil end portion 3a with an adhesive, a plurality of holes H (two in this embodiment) are formed in the module body BB of the bus bar module BM so as to respectively penetrate the bus bar module BM. In this embodiment, as shown in FIG. 4, one hole H is formed at each end of the module body BB in a longitudinal direction. As shown in FIGS. 5 and 6, each of the holes H is a tapered hole that tapers toward the coil end portion 3a and has a polygonal planar shape. That is, an inner peripheral surface Si of each of the holes H is formed in a funnel shape (mortar shape) and approaches a central portion of the hole H as it goes toward the side of the coil end portion 3a.

Further, a bridge portion BR is formed in each of the holes H of the module body BB. In this embodiment, as shown in FIG. 6, the bridge portion BR is formed in a round bar shape having an outer diameter smaller than a thickness of the module body BB and is arranged in the hole H so as to be close to a surface (lower surface in FIG. 6) of the module body BB on the side of the coil end portion 3a. The bridge portion BR extends from a part of the inner peripheral surface Si of the corresponding hole portion H to another part of the inner peripheral surface Si facing the part so as to divide an inside of the hole H into a plurality of opening regions OA. That is, as shown in FIG. 5, one opening region OA is formed on each side of the bridge portion BR. Further, in this embodiment, the bridge portion BR extends in a direction orthogonal to the central axis in the longitudinal direction of the module body BB extending in an arc shape. That is, each of the bridge portions BR is formed in the module body BB so as to extend in the radial direction of the stator core 2 when the bus bar module BM is fixed to the coil end portion 3a.

Figure 7:
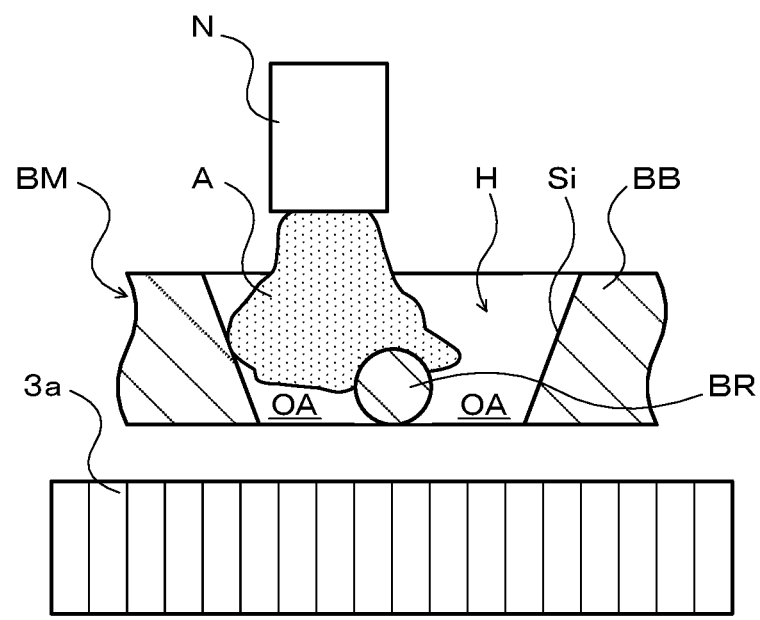
FIG. 7 is a schematic view explaining a procedure for fixing the busbar module to the coil end portion.

When fixing the bus bar module BM to the coil end portion 3a formed on one end side of the stator core 2, the bus bar module BM is positioned on the outer surface of the coil end portion 3a by means of a jig or the like (not shown) after welding the leader lines 40u, 40v, 40w of the stator coils 3u, 3v, 3w, the neutral lines 40n, and the tip portions 51 of the power lines 50u, 50v, 50w to the corresponding terminals Tu, Tv, Tw, Tn, Tpu, Tpv or Tpw of the bus bar module BM. Further, a current is applied to each of the stator coils 3u, 3v, 3w from, for example, a DC power source to heat (preheat) the stator coils 3u, 3v, 3w to a predetermined temperature. Next, as shown in FIG. 7, a nozzle N is moved above the hole H of the module body BB and the adhesive A is dropped from the nozzle N toward the hole H. In this embodiment, a high-viscosity varnish having a higher viscosity than the varnish for fixing the segment coils 4 and the insulators to the stator core 2 is used as the adhesive A.

Figure 8:
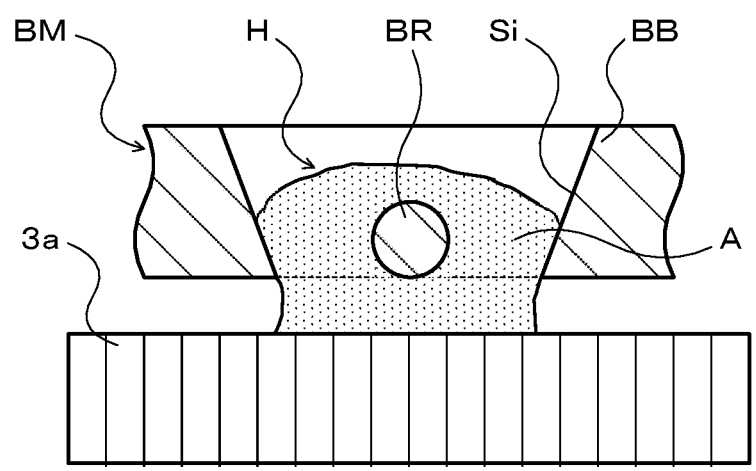
FIG. 8 is an enlarged view illustrating a fixing portion between the busbar module and the coil end portion.

As shown in FIG. 7, the adhesive A dropped from the nozzle N and introduced into the hole H passes through the two opening regions OA formed on both sides of the bridge portion BR after hitting against the bridge portion BR. Then, the adhesive A reaches the coil end portion 3a. As a result, as shown in FIG. 8, the adhesive A adheres to the bridge portion BR so as to surround the bridge portion BR and adheres to the inner peripheral surface Si of the hole H, such that a contact area between the adhesive A and the module body BB is sufficiently increased. Further, since the opening regions OA are formed on both sides of the bridge portion BR, the adhesive A adheres to the inner peripheral surfaces Si of the bridge portion BR and the hole H sufficiently inside a peripheral edge portion of the module body BB. After dropping a predetermined amount of the adhesive A to each of the holes H, the adhesive A is cured by energizing the stator coils 3u, 3v, 3w, heating in a heating furnace, or the like. As a result, the adhesive A introduced into each hole H is cured, such that each bridge portion BR and the inner peripheral surface Si, that is, the module body BB are fixed to the coil end portion 3a via the cured adhesive A.

As described above, the busbar module BM enables a contact area between the adhesive A and the module body BB to be sufficiently increased. As a result, a fixing strength of the module body BB to the coil end portion 3a is improved as compared with the case where the adhesive is introduced into the through groove of the peripheral edge portion of the module body BB. Accordingly, in the stator 1, the busbar module BM is more firmly fixed to the coil end portion 3a formed on one end side of the stator core 2 with the adhesive, such that the forces applied to the welded portions between the bus bar module BM and the stator coils 3*u*, 3*v*, 3*w*, the power line 50*u*, 50*v*, 50*w* are reduced. As a result, durability of the of welded portions is ensured and electrical connections between the busbar module BM and the stator coils 3*a*, 3*b*, 3*c*, the power line 50*u*, 50*v*, 50*w* are favorably maintained.

Further, in the bus bar module BM, the inner peripheral surface Si of the hole H is inclined so as to the central portion of the hole H as it goes toward the side of the coil end portion 3*a*. Thus, even if the nozzle N for introducing the adhesive A and the hole H are displaced from each other, the adhesive A is smoothly applied to the bridge portion BR and the coil end portion 3*a* along the inclined inner peripheral surface Si. As a result, an increase in the amount of the adhesive A used is suppress and time required for fixing the bus bar module BM is shorten. In addition, since the hole H is tapered toward the coil end portion 3*a*, as shown in FIG. 8, the contact area between the adhesive A and the inner peripheral surface Si of the hole H is increased so at to improve the fixing strength of the module body BB with respect to the coil end portion 3*a*.

Further, in the bus bar module BM, each of the bridge portions BR is formed in the round bar shape having the outer diameter smaller than the thickness of the module body BB. Thus, a generation of stress in the adhesive A that adheres to the bridge portion BR and cured thereon is suppressed, and an adhesive strength between the bridge portion BR and the adhesive A is satisfactorily maintained. In addition, each of the bridge portions BR is arranged in the corresponding hole H so as to be close to a surface of the module body BB on the side of the coil end portion 3*a*. This enables a sufficient amount of the adhesive A to be retained around the bridge portion BR so as to increase the contact area between the adhesive A and the module body BB. The bridge portion BR is not limited to one having a circular cross-sectional shape as long as it suppresses the generation of stress in the adhesive A that adheres to the bridge portion BR and cured thereon. That is, the bridge portion BR may have a cross-sectional shape without corners, such as an ellipse or a polygon with chamfered corners.

Further, in the bus bar module BM, the bridge portion BR is formed in the module body BB so as to extend in the radial direction of the stator core 2. Thus, opening areas on both sides of the bridge portion BR are sufficiently and appropriately secured while suppressing an increase in a length of the hole H in the radial direction the stator core 2, such that a strength of the module body BB, which has a short length in the radial direction of the stator core 2, is favorably secured. In the bus bar module BM, the bridge portion BR may be formed so as to extend in the hole H along the circumferential direction of the stator core 2.

Figure 9:
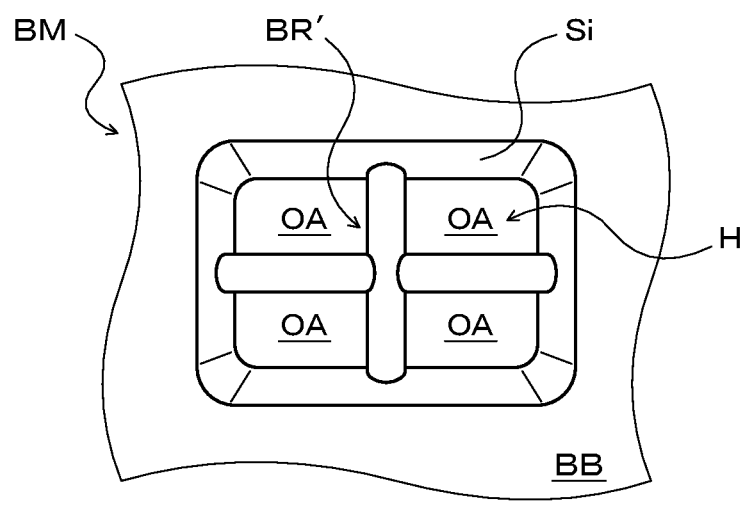
FIG. 9 is an enlarged view illustrating another bridge portion applicable to the busbar module according to the present disclosure.

Further, as shown in FIG. 9, a bridge portion BR' including two bars intersecting (orthogonally) with each other may be formed in the hole portion H of the bus bar module BM. In such an embodiment, opening regions OA are secured on both sides of each bar of the bridge portion BR', and a contact area between the bridge portion BR' and the adhesive A becomes larger. Although not shown, the bridge portion may be formed by a plurality of bars extending in a grid pattern or in a radial pattern. Further, the bus bar module BM may include at least one hole H and at least one bridge portion BR, and may include three or more of the hole H and three or more of the bridge portion BR.

Further, the bus bar module BM includes a busbar Bn forming the neutral point of the stator coils 3*u*, 3*v*, 3*w*, and connects each of the stator coils 3*u*, 3*v*, 3*w* to the corresponding power lines 50*u*, 50*v*, 50*w*. However, it is not limited to this. That is, the bus bar module BM may have only a function of connecting each of the stator coils 3*u*, 3*v*, 3*w* to the corresponding power lines 50*u*, 50*v*, 50*w*, and the plurality of stator coils 3*u*, 3*v*. The bus bar module BM may have only a function of forming the neutral point of stator coils 3*u*, 3*v*, 3*w*.

Figure 10:
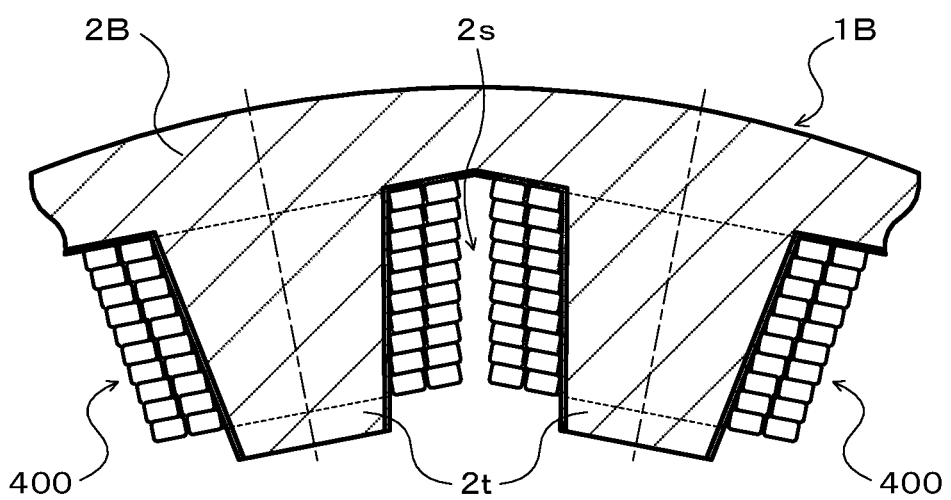
FIG. 10 is an enlarged view illustrating another stator according to the present disclosure.

Further, the bus bar module BM has been described as being applied to a stator 1 including the stator coils 3*u*, 3*v*, 3*w* formed by electrically connecting a plurality of segment coils 4. However, the bus bar module BM is not limited to this. That is, the bus bar module BM may be applied to a stator 1B in which a plurality of stator coils are formed by electrically connecting a plurality of cassette coils (concentrated winding coils) 400 as shown in FIG. 10. Prior to mounting on the stator core 2B, the cassette coil 400 is formed by winding one rectangular wire having, for example, a rectangular (including a square) cross section in a plurality of steps (for example, about 10 steps) along the outer peripheral surface of the teeth portion 2*t* of the stator core 2B and winding the rectangular wire around a winding shaft a plurality of times (twice in the example of FIG. 10) or only once.

Further, the stator coils 3*u*, 3*v*, 3*w* of the stator 1 are connected by a double star connection (2Y connection). However, the stator coils 3*u*, 3*v*, 3*w* are not limited to this. That is, the stator coils 3*u*, 3*v*, 3*w* may be connected in a manner other than the 2Y connection such as a single star (1Y) connection, a 4Y connection, or a delta connection. Further, the bus bar module BM may be fixed to an end surface (upper end surface) of the stator core 2 via the adhesive A introduced into the hole H. Further, the adhesive A may be a thermosetting resin or the like other than the high-viscosity varnish as long as it has a relatively high viscosity.

As has been described above, the stator of the present disclosure includes the stator core (2, 2B), the stator coil (3*u*, 3*v*, 3*w*) wound around the stator core (2, 2B), and the busbar module (BM) electrically connected to the stator coil (3*u*, 3*v*, 3*w*) and fixed to the coil end portion (3*a*) formed on one end side of the stator core (2, 2B). The busbar module (BM) includes the module body (BB) that holds the conductive member (Bu, By, Bw, Bn), the hole (H) that penetrates the module body (BB), and the bridge portion (BR) that extends from the part of the inner peripheral surface (Si) of the hole (H) to another part of the inner peripheral surface (Si) so as to divide the inside of the hole (H) into a plurality of opening regions (OA) and is fixed to the coil end portion (3*a*) with the adhesive (A) introduced into the hole (H) and cured therein.

The stator of the present disclosure includes the busbar module electrically connected to the stator coil and fixed to the coil end portion formed on one end side of the stator core. The module body of the busbar module includes the hole that penetrates the module body, and a bridge portion that is fixed to the coil end portion with the adhesive introduced into the hole and cured therein. The bridge portion extends from the part of the inner peripheral surface of the hole to another part of the inner peripheral surface so as to divide the inside of the hole into the opening regions. Thus, opening regions are formed on both sides of the bridge portion, and the adhesive introduced into the hole reaches the coil end portion through the opening regions on both sides of the bridge portion after hitting against the bridge portion. As a result, the adhesive adheres to the bridge portion so as to surround the bridge portion and adheres to the inner peripheral surface of the hole, such that a contact area between the adhesive and the module body is sufficiently increased. Further, since the opening regions are formed on both sides of the bridge portion, the adhesive adheres to the inner peripheral surfaces of the bridge portion and the hole sufficiently inside a peripheral edge portion of the module body and is cured therein. As a result, a fixing strength of the module body to the coil end portion is improved as compared with the case where the adhesive is introduced into the through groove of the peripheral edge portion of the module body. Accordingly, in the stator of the present disclosure, the busbar module is more firmly fixed to the coil end portion formed on one end side of the stator core with the adhesive, such that electrical connections between the stator coils and the busbar module are favorably maintained.

The inner peripheral surface (Si) of the hole (H) may be inclined so as to approach the central portion of the hole (H) as it goes toward the side of the coil end portion (3a). Thus, even if the nozzle or the like for introducing the adhesive and the hole are displaced from each other, the adhesive is smoothly applied to the bridge portion and the coil end portion along the inclined inner peripheral surface. As a result, the increase in the amount of the adhesive used is suppress and time required for fixing the bus bar module is shorten. In addition, since the hole is tapered toward the coil end portion, the contact area between the adhesive and the inner peripheral surface of the hole is increased so at to improve the fixing strength of the module body with respect to the coil end portion.

The bridge portion (BR) may be formed on the module body (BB) so as to extend in the radial direction of the stator core (2, 2B). This enables opening areas on both sides of the bridge portion to be sufficiently and appropriately secured.

The bridge portion (BR) may have the cross-sectional shape without corners. This suppresses a generation of stress in the adhesive that adheres to the bridge portion and cured thereon and satisfactorily maintains the adhesive strength between the bridge portion and the adhesive.

The bridge portion (BR) may be formed in the round bar shape having the outer diameter smaller than the thickness of the module body (BB) and may be arranged in the hole (H) so as to be close to the surface of the module body (BB) on the side of the coil end portion (3a). This satisfactorily maintains the adhesive strength between the bridge portion and the adhesive and enables the sufficient amount of the adhesive to be retained around the bridge portion so as to increase the contact area between the adhesive and the module body.

A plurality of the stator coils (3u, 3v, 3w) may be wound around the stator core (2,2B) and the busbar module (BM) may form the neutral points (BM) of the plurality of stator coils (3u, 3v, 3w) and connect each of the plurality of stator coils (3u, 3v, 3w) to the corresponding power line (50u, 50v, 50w). The busbar module (BM) of the present disclosure is electrically connected to the stator coil (3u, 3v, 3w) wound around the stator core (2, 2B) and is fixed to the coil end portion (3a) formed on one end side of the stator core (2, 2B). The busbar module (BM) includes the module body (BB) that holds the conductive member (Bu, Bv, Bw, Bn), the hole (H) that penetrates the module body (BB), and the bridge portion (BR) that extends from the part of the inner peripheral surface (Si) of the hole (H) to another part of the inner peripheral surface (Si) so as to divide the inside of the hole (H) into a plurality of opening regions (OA) and is fixed to the coil end portion (3a) with the adhesive (A) introduced into the hole (H) and cured therein. In the busbar module, the module body is more firmly fixed to the coil end portion formed on one end side of the stator core with the adhesive.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the rotating electrical machine and the stator.

The invention claimed is:

1. A stator comprising:
    a stator core;
    a stator coil wound around the stator core; and
    a busbar module electrically connected to the stator coil and fixed to a coil end portion formed on one end side of the stator core, the busbar module including a module body that holds a conductive member, a hole that penetrates the module body, and a bridge portion that extends from a part of the inner peripheral surface of the hole to another part of the inner peripheral surface so as to divide an inside of the hole into a plurality of opening regions and is fixed to the coil end portion with an adhesive introduced into the hole and cured therein.

2. The stator according to claim 1,
    wherein an inner peripheral surface of the hole is inclined so as to approach a central portion of the hole as it goes toward a side of the coil end portion.

3. The stator according to claim 1,
    wherein the bridge portion is formed on the module body so as to extend in the radial direction of the stator core.

4. The stator according to claim 1,
    wherein the bridge portion has a cross-sectional shape without corners.

5. The stator according to claim 4,
    wherein the bridge portion is formed in a round bar shape having an outer diameter smaller than a thickness of the module body and is arranged in the hole so as to be close to a surface of the module body on the side of the coil end portion.

6. The stator according to claim 1,
    wherein the plurality of the stator coils are wound around the stator core, and wherein the busbar module forms a neutral points of the plurality of stator coils and connects each of the plurality of stator coils to a corresponding power line.

7. A busbar module electrically connected to a stator coil wound around a stator core and is fixed to a coil end portion formed on one end side of the stator core, the busbar module comprising:
    a module body that holds a conductive member;
    a hole that penetrates the module body; and
    a bridge portion that extends from a part of the inner peripheral surface of the hole to another part of the inner peripheral surface so as to divide an inside of the hole into a plurality of opening regions and is fixed to the coil end portion with an adhesive introduced into the hole and cured therein.

* * * * *